(12) United States Patent
Barr et al.

(10) Patent No.: US 8,826,288 B2
(45) Date of Patent: Sep. 2, 2014

(54) COMPUTING WITH BOTH LOCK-STEP AND FREE-STEP PROCESSOR MODES

(75) Inventors: Andrew H. Barr, Roseville, CA (US); Ken G. Pomaranski, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1938 days.

(21) Appl. No.: 11/109,352

(22) Filed: Apr. 19, 2005

(65) Prior Publication Data

US 2006/0245264 A1    Nov. 2, 2006

(51) Int. Cl.
*G06F 9/46* (2006.01)

(52) U.S. Cl.
USPC .......................................... 718/104

(58) Field of Classification Search
USPC ....................................... 718/104
See application file for complete search history.

(56) References Cited

U.S. PATENT DOCUMENTS

| | | | | |
|---|---|---|---|---|
| 5,675,794 A | * | 10/1997 | Meredith | 713/1 |
| 6,157,967 A | * | 12/2000 | Horst et al. | 710/19 |
| 6,173,306 B1 | * | 1/2001 | Raz et al. | 718/102 |
| 6,615,366 B1 | * | 9/2003 | Grochowski et al. | 714/10 |
| 6,615,368 B1 | | 9/2003 | Grochowski et al. | |
| 6,618,630 B1 | * | 9/2003 | Jundt et al. | 700/17 |
| 6,829,713 B2 | * | 12/2004 | Cooper et al. | 713/320 |
| 7,249,358 B2 | * | 7/2007 | Emma et al. | 718/105 |
| 7,526,767 B1 | * | 4/2009 | Rhee et al. | 718/104 |
| 2004/0153857 A1 | | 8/2004 | Yamazaki et al. | |

OTHER PUBLICATIONS

G.J. Lipovski, SIMD and MIMD Processing in the Texas Reconfigurable Array Computer, Dept. of Electrical & Computer Engineering, 1998, pp. 268-271.
A.N. Choudhary et al., A Reconfigurable and Hierarchical Parallel Processing Architecture Performanc Results for Stereo Vision, Dept. of Electrical & Computer Engineering, Syracuse University, 1990, pp. 389-393.

* cited by examiner

*Primary Examiner* — Gregory A Kessler

(57) ABSTRACT

A computer system provides for both lock-step and free-step processor modes, allowing for an effective tradeoff between performance and data integrity.

6 Claims, 2 Drawing Sheets

COMPUTING WITH BOTH LOCK-STEP AND FREE-STEP PROCESSOR MODES

BACKGROUND OF THE INVENTION

The present invention relates to computers and, more particularly, to error-handling in computers. In this specification, related art labeled "prior art" is admitted prior art; related art not labeled "prior art" is not admitted prior art.

Applications for which errors are unacceptable can be run on computers that detect and address errors that inevitably occur. For example, parity bits or error-correction code bits can be added to data being communicated so that errors can be detected and, in some cases, corrected. If the errors cannot be corrected, often the data can be regenerated or retransmitted. However, it is generally impractical to employ error detection and error correction extensively within a processor. Accordingly, data corruptions occuring with in a processor are often undetected, i.e., "silent".

Such silent data corruption can be addressed by running two or more processors in lock-step. In other words, the same program is run on two processors. The processor outputs can then be compared with differences being used to indicate errors, with various approaches being available for addressing the detected errors.

SUMMARY OF THE INVENTION

As defined in the claims, the present invention provides for both lock-step and free-step (normal, non-lockstep) operation in the same computer system. Various embodiments of the invention include systems in which the step mode for each processor is fixed, in which step modes can be configured (e.g., upon boot-up), and systems in which the step mode is dynamically reallocable. In each case, the invention provides for more optimal trade-offs between error detection and performance, as operating processors in free-step mode generally provides greater performance at the risk of greater vulnerability to errors. These and other features and advantages of the invention are apparent from the description below with reference to the following drawings.

DETAILED DESCRIPTION

Figure 1:
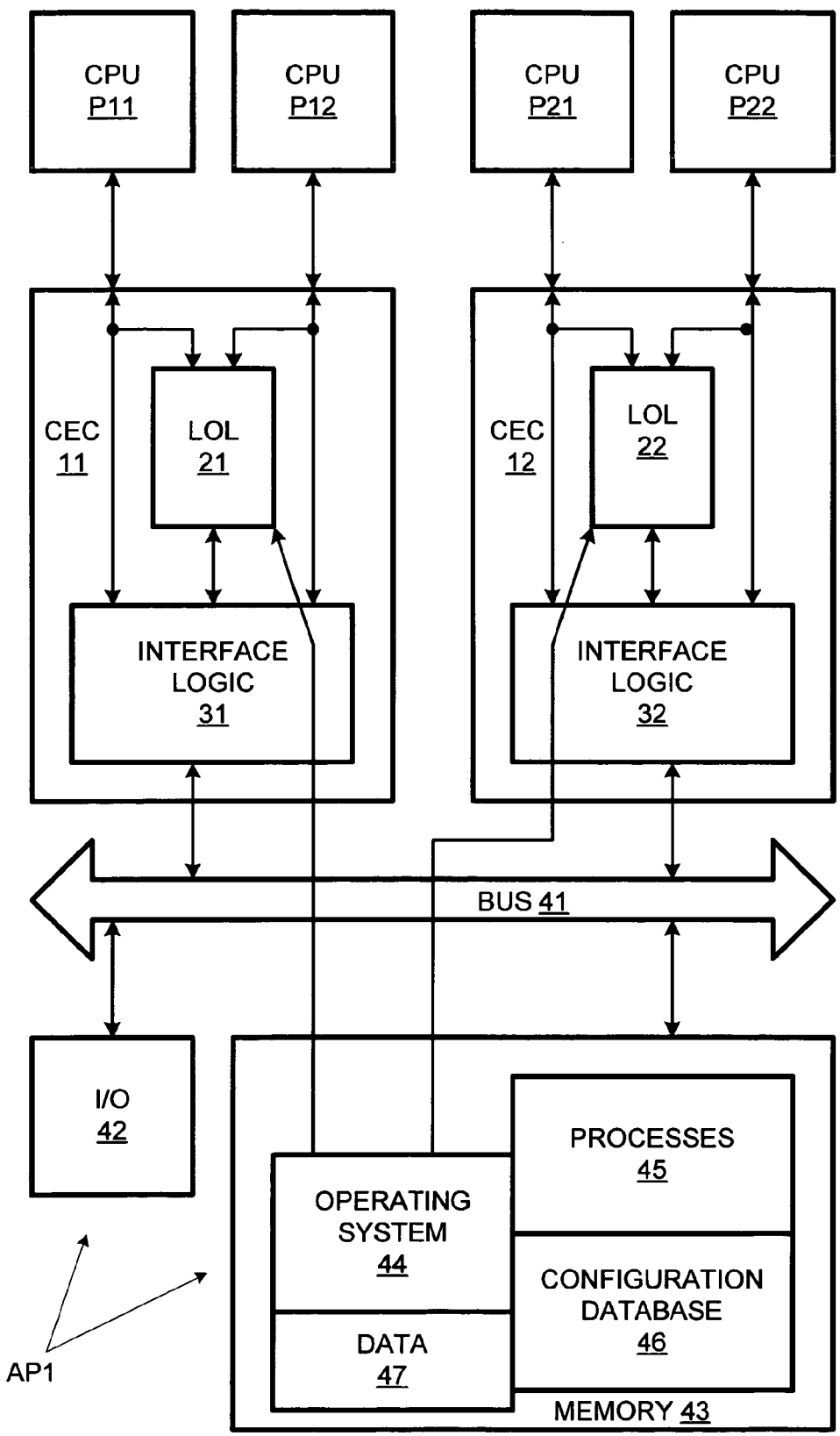
FIG. 1 is a schematic illustration of one of many possible computer systems in accordance with the present invention.

A computer system AP1 shown in FIG. 1 includes four processors P11, P12, P21, P22. Processors P11 and P12 interface to the rest of system AP1 via a core electronics component (CEC) 11, while processors P21 and P22 interface to the rest of the system via a different core electronics component 12. In effect, core electronic components 11 and 12 define two processor sets, one including processors P11 and P12, and the other including processors P21 and P22. In other embodiments, different numbers of processors can be used and they can be assigned to sets in a variety of ways. In some embodiments, the set of processors associated with a core electronic component define a true system partition with the conventional constraints regarding the processors, the operating system, and resources; in other embodiments, such constraints do not apply.

Core electronic component 11 includes loss-of-lockstep logic 21 and interface logic 31; similarly, core electronic component 12 includes loss-of-lockstep logic 22 and interface logic 32. Interface logics 31 and 32 provide for the convention functions of core electronic components, e.g., interfacing processors with the rest of a system. When a set of processors are in lock-step mode, data from the processors is directed to the respective loss-of-lockstep logic (LOL) 21 or 22. Loss-of-lockstep logics initiate error handling procedures when an error is detected as a loss of lockstep, e.g., when the associated processors provide different outputs for the same inputs. When the associated processors are in free-step mode, data from the processors bypasses the associated loss-of-lockstep logic and the core electronics components acts conventionally. Core electronics components 11 and 12 and in particular loss of lockstep logics 21 and 22 include inputs for controlling the step mode, e.g., as directed by operating system 44, per configuration instructions setup by the user of the system partition running that operating system.

In system AP1, core electronic components 11 and 12 are defined on respective substrates distinct from substrates bearing processors P11, P12, P21, P22. In alternative embodiments, various combinations of processors and core electronic components can be formed on common substrates.

As illustrated, core electronic components 11 and 12 interface with the rest of system AP1 via a bus 41. More generally, the interfacing can be done via a combination of buses or a network fabric. The rest of system AP1 includes, among other components, input-output channels 42 and memory 43. Memory 43 includes random access memory, hard disk storage, and other storage media.

Memory 43 stores an operating system 44, processes 45, a configuration database 46, and data 47. Database 46 contains basic lockstep configuration data including: 1) indicating which CPUs are to be in lock-step mode and which should be in free-step mode; 2) some 'rules' which can dynamically change this assignment; and 3) a list of processes that should run in lock-step mode. Processes are run in free-step mode by default unless the configuration database indicates otherwise.

Another embodiment could have this default setting reversed. Some of processes 45 belong to the operating system, while others belong to applications. When a process is called, operating system 44 checks configuration database 46 to determine whether to assign that process to a set of processors in lock-step mode or a processor in free-step mode. Some processes may require assignment to a lock-step mode, while others may require free-step mode. For other processes, database 46 can indicate criteria for assigning a process to one step mode or the other. For example, resource utilization and/or time of day data can be factors in determining whether to assign a process to a lock-step processor or a free-step processor.

When system AP1 is booted, operating system 44 checks database 46 for system configuration data to determine which processors are to be assigned to lock-step mode and which are to be assigned to free-step mode. In system AP1, this assignment is done on a set-by-set basis. While system AP1 is running, operating system 44 monitors resource utilization and, if configuration data permits, writes to database 46 to indicate an assignment of step modes to be assumed the next time system AP1 is booted. This feature is most useful for systems with many sets of processors.

If so configured, operating system 44 can also use resource utilization data to dynamically switch processor step modes. For example, when there is excess demand for data integrity, both processor sets can be set to lock step mode. On the other hand, when greater performance is required and data integrity is less critical, both sets can be assigned to free-step mode.

Figure 2:
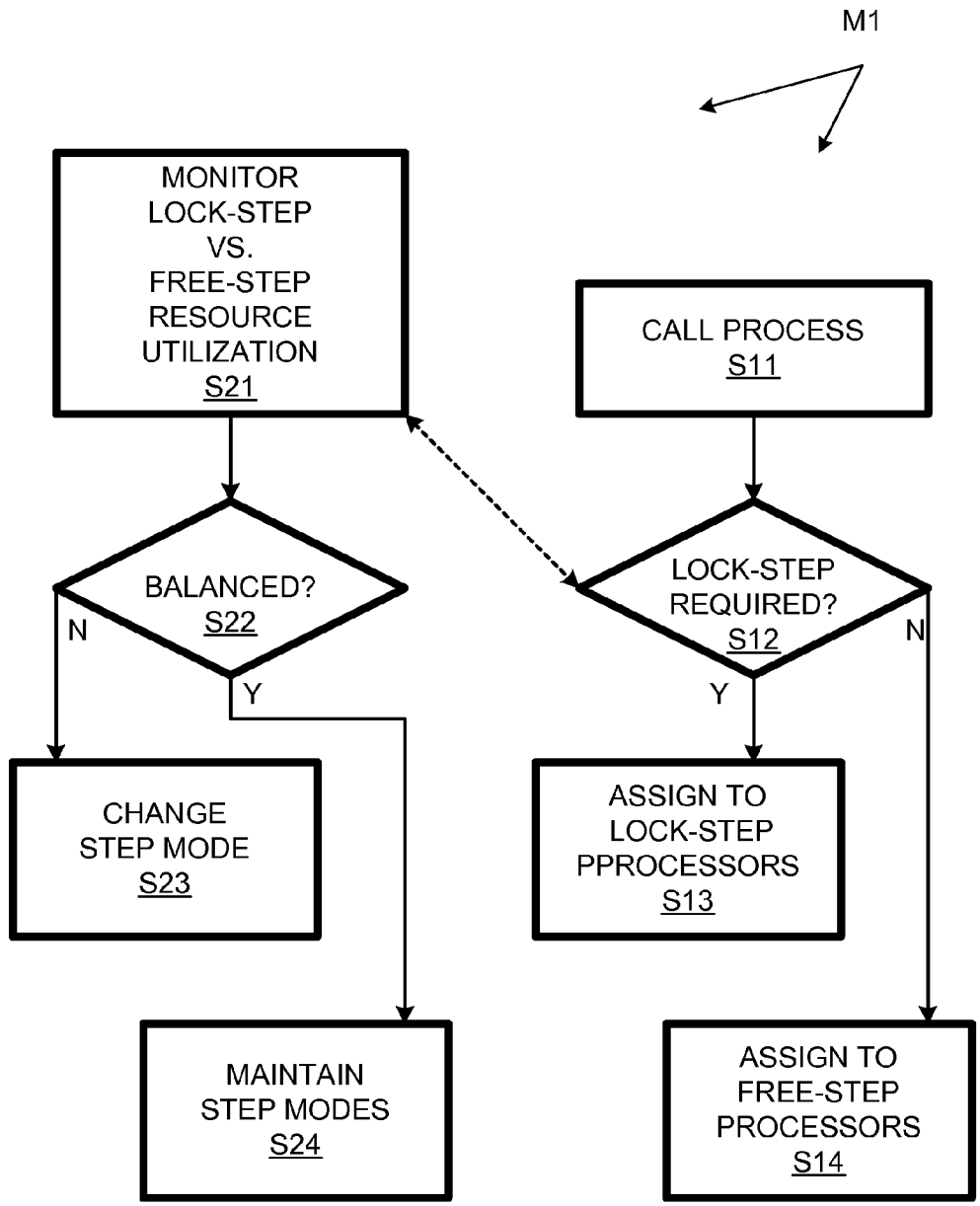
FIG. 2 is a flow chart of one of many possible methods in accordance with the present invention.

Some of these capabilities are used in method M1, flowcharted in FIG. 2. Operating system 44 can call a process at method segment S11. At method segment S12, operating system 44 checks database 46 to determine the step mode for the called process. Lock-step mode may be required, free-step mode may be required, or some criteria can be specified for determining the step mode for the process. For example, lock-step mode may be favored at night, when utilization is relative low and performance is less critical. Also, a process may prefer one mode but allow the other mode when resource utilization data favors the other mode. Depending on the outcome of the step-mode determination, the process can be assigned to a processor in lock step mode at method segment S13 or to a processor in free-step mode at step S14.

Method segments S21-S24 operate concurrently with method segments S11-S24. In method segment S21, operating system 44 monitors resource allocation between processors in lock-step mode versus processors in free-step mode. At method segment S22, a determination is made whether the resource utilization is sufficiently balanced. If one mode is stressed, the processor sets can be reallocated at method segment S23; for example, operating system 44 can signal a core electronics component to place its set of processors in the selected step mode. If supply and demand for the step modes are reasonably balanced, the processor modes can be maintained at method segment S24. Depending on the system configuration, the reallocation can take effect upon restart or can be implemented dynamically. Alternatively, system AP1 can be configured to preclude reallocation of step modes.

Reallocation method segments S21-S24 can interact with assignment method segments S11-S14. In particular, resource allocation data generated in method segment S21 can be used in mode assignment method segment S12 to determine which mode a process should be assigned to, e.g., when the configuration data for that process indicates the mode should favor less utilized resources. Likewise, assignment determinations at method segment S12 can be used as raw data in monitoring resource utilization at method segment S21.

The invention provides for embodiments with as few as two processors. In such a case, both processors can operate in lock-step mode or both can operate in free-step, mode. Systems with three processors have more possibilities. One pair can operate in lock-step mode while the third operates in free-step mode. The pair can be fixed or formed from different combinations of processors. Also, all three can operate in lock-step mode in some circumstances. Greater numbers of processors offer more possibilities. In practice, the association of processors to core electronic components limits the combinations of processors that can be run together in lock step. These and other variations upon and modifications to the described embodiment are provided for by the present invention, the scope of which is defined by the following claims.

What is claimed is:

1. A method comprising:
   operating plural processors so that two or more said processors are operating, in lock-step mode and one or more of said processors are operating in free-step mode;
   tracking utilization of said processors so as to determine a lock-step utilization for processors in said lock-step mode and a free-step utilization for processors in said free-step mode;
   determining whether to switch the step mode of one or more of said plural processors at least in part as a function of said lock-step utilization and said free-step utilization,
   calling a process;
   checking a configuration database to determine whether or not said process is to be assigned to processors in lock-step mode; and
   if said process is required to be assigned to processors in lock-step mode, assigning said process to processors in lock-step mode.

2. The method of claim 1 further comprising:
   if said process is not required to be assigned to processors in lock-step mode, assigning said process to a processor in free-step mode.

3. The method of claim 1 further comprising:
   if said process is not required to be assigned to processors in lock-step mode, assigning said process to a processor in free-step mode or to processors in lock-step mode at least in part as a function of processor utilization.

4. A system comprising:
   processors configurable to operate either in lock-step mode or free-step mode;
   a resource allocation monitor to:
      determine a lock-step utilization for processors in said lock-step mode and a free-step utilization for processors in said free-step mode; and
      determine whether to switch the step mode of some of said processors at least in part as a function of said lock-step utilization and said free-step utilization, wherein said resource allocation monitor is provided by an operating system; and
   memory encoded with said operating system and a database indicating which process should be assigned to processors in lock-step mode.

5. A system comprising a memory device encoded with an operating system that monitors resource allocation to determine whether or not resource allocation is balanced between processors in lock-step mode and processors in free-step mode, wherein said operating system further provides for changing the step mode of some of said processors in an event the resource allocation between processors in lock-step mode and processor in free-step mode is determined to be unbalanced so that the resource allocation becomes balanced, and wherein said memory device is further encoded with a database indicating which processes should be assigned to processors in lock-step mode.

6. The system of claim 5 further comprising said processors, said processors including one or more processors for executing said operating system.

\* \* \* \* \*

UNITED STATES PATENT AND TRADEMARK OFFICE
CERTIFICATE OF CORRECTION

PATENT NO.       : 8,826,288 B2                                             Page 1 of 1
APPLICATION NO.  : 11/109352
DATED            : September 2, 2014
INVENTOR(S)      : Barr et al.

It is certified that error appears in the above-identified patent and that said Letters Patent is hereby corrected as shown below:

In the Specification

Column 1, line 19, delete "occuring" and insert -- occurring --, therefor.

Column 2, line 5, delete "convention" and insert -- conventional --, therefor.

Column 2, line 10, after "logics" insert -- 21 and 22 --.

Column 2, line 15, delete "acts" and insert -- act --, therefor.

Column 3, line 19, delete "S11-S24." and insert -- S11-S14. --, therefor.

In the Claims

Column 4, line 4, Claim 1, delete "operating," and insert -- operating --, therefor.

Column 4, line 50, Claim 5, delete "processor" and insert -- processors --, therefor.

Signed and Sealed this
Third Day of March, 2015

Michelle K. Lee
*Deputy Director of the United States Patent and Trademark Office*